Patented Aug. 7, 1934

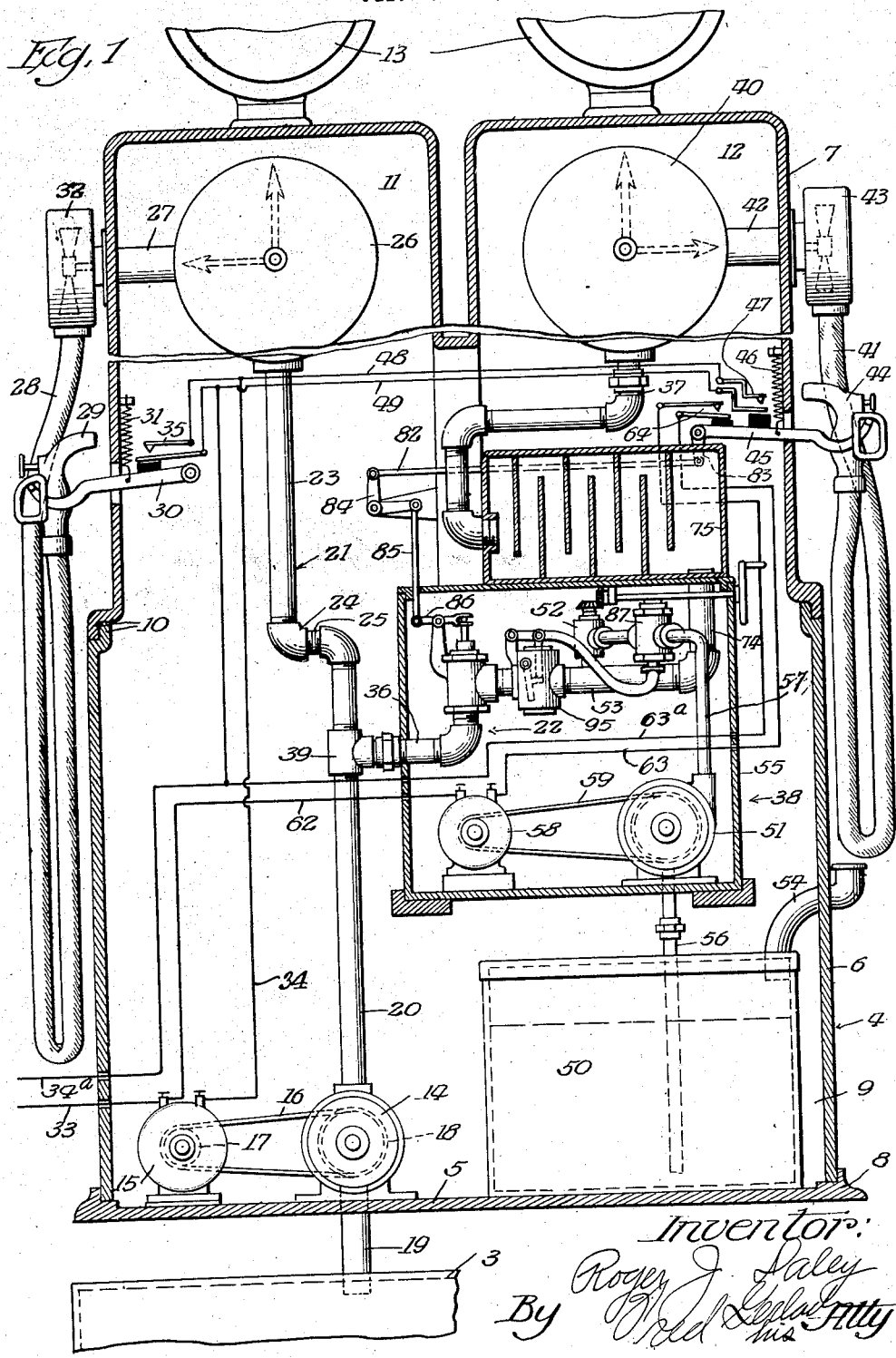

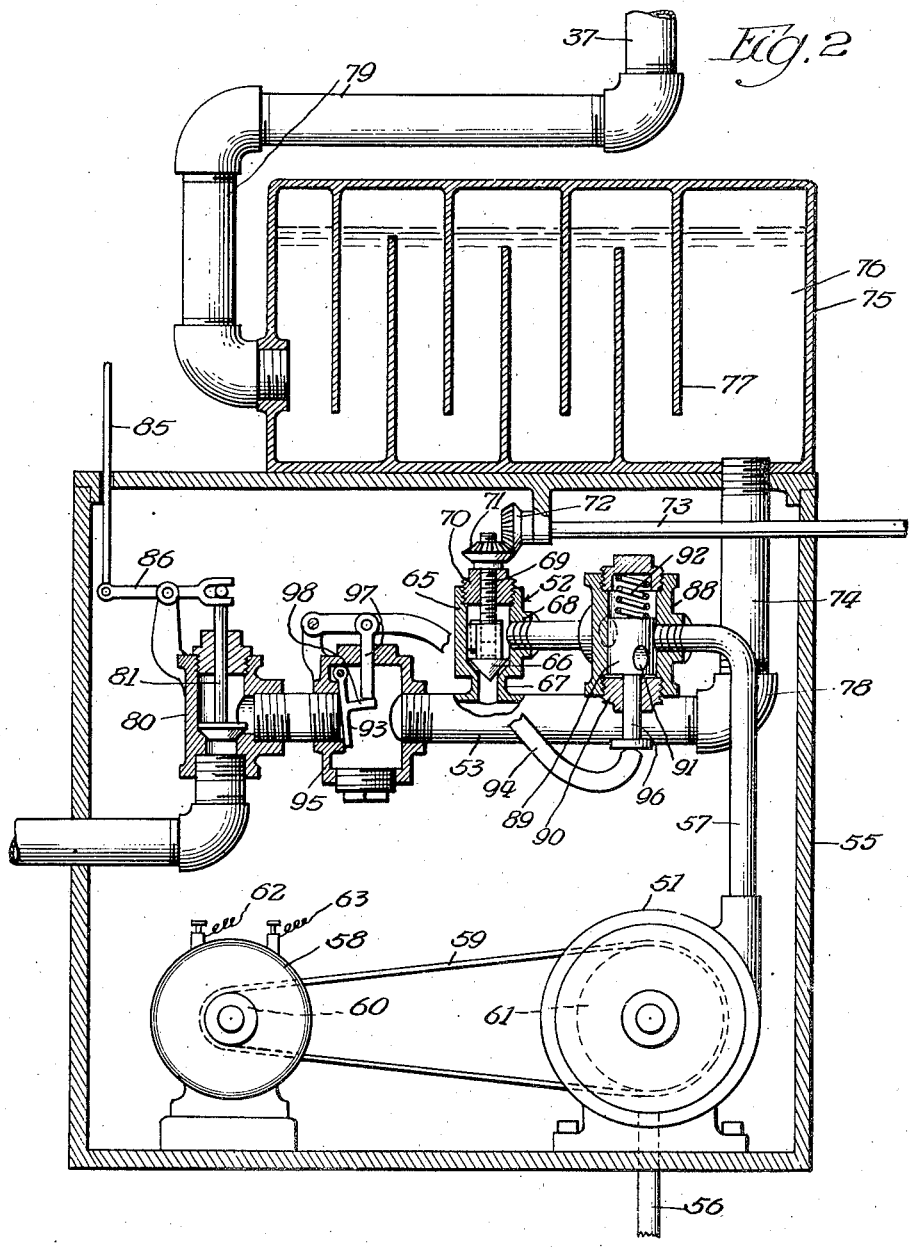

1,969,360

UNITED STATES PATENT OFFICE 1,969,360

GASOLINE-DISPENSING APPARATUS

Roger J. Daley, Chicago, Ill.

Application January 9, 1933, Serial No. 650,824

14 Claims. (Cl. 221—95)

The invention relates generally to apparatus for dispensing gasoline to automobiles, trucks and other motor vehicles. More particularly, the invention relates to that type of apparatus which is designed to be used at filling stations and in garages and like establisments, and comprises mechanism for dispensing low test or regular gasoline and high test gasoline, that is, regular gasoline with a predetermined amount of lead tetra-ethyl or like material for the purpose of making it more potential.

Heretofore, it has been the practice to mix the high test gasoline at the refinery and to deliver the high test and low test gasoline in separate tanks to the gasoline dispenser. In addition, it has been the practice in connection with gasoline-dispensing apparatus of the aforementioned type, to use separate tanks for storing the high test and low test gasoline and to employ two separate motor-driven pumps for dispensing the gasoline from the tanks. Because of this practice, it is incumbent upon the refinery to employ separate storage tanks for the two types of gasoline and expensive mixing apparatus, and also to employ separate tank cars or tank trucks for suppying the low test and high test gasoline to the gasoline distributor. In addition, the gasoline dispensing apparatus of the dispenser is costly because of the fact that two tanks and motor-driven pumps are needed, and in the dispensing of the gasoline the dispenser is likely to deplete one tank before the other with the result that it is necessary to fill the two tanks at different times.

One object of the present invention is to provide a gasoline-dispensing apparatus of the type under consideration which eliminates the previously employed practice of mixing the high test gasoline at the refinery and storing and delivering it in tanks separate from those containing low test gasoline, and also is less costly and more practical to the dispenser than previously designed apparatus in that it comprehends but a single tank for low test gasoline and a single motor-driven pump with a low test outlet branch and a high test outlet branch, and further comprehends mechanism for mixing the high test fluid with the low test gasoline as it flows through the high test branch.

Another object of the invention is to provide a gasoline-dispensing apparatus of the last mentioned character in which the mechanism for mixing the high test fluid with the low test gasoline comprises a tank for the high test fluid and a motor-driven pump for drawing the high test fluid from the tank and delivering it to the high test branch when the latter is used to dispense high test gasoline.

Another object of the invention is to provide a gasoline-dispensing apparatus of the high test type herein referred to which embodies a dispensing hose at the outlet end of the high test branch and a valve-equipped nozzle for the hose, and is provided with a hook which serves to hold the nozzle when the hose is not in use and is arranged so that when the nozzle is withdrawn therefrom, it closes switches for the motor for driving the main pump and the motor for driving the pump for the high test fluid in order that both pumps are automatically set into operation for high test gasoline-dispensing purposes.

A further object of the invention is to provide a gasoline-dispensing apparatus of the type and character under consideration in which the high test branch embodies a baffle-equipped chamber through which the low test gasoline and high test fluid pass for mixing purposes prior to discharge through the hose, and further embodies a check valve whereby back flow of the mixed low test gasoline and high test fluid is prevented when the fluid in the nozzle of the hose is closed for stoppage of flow of high test gasoline, and hence there is no likelihood of high test fluid reaching the main storage tank or being discharged through the low test branch of the apparatus.

A still further object of the invention is to provide a gasoline-dispensing apparatus which is generally of new and improved construction, may be manufactured at a low and reasonable cost and is exceedingly efficient in operation.

Other objects of the invention and the various advantages and characteristics of the present dispensing apparatus will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a vertical sectional view of a gasoline-dispensing apparatus embodying the invention, illustrating in detail the arrangement of the low test and high test branches with respect to the main motor-driven pump, and showing the electrical connections whereby the motor for the main pump and the pump for delivering high test fluid into the high test branch are automatically controlled; and Figure 2 is a detail sectional view of the mechanism for mixing the high test fluid with the low test gasoline as it flows through the high test branch to the hose with the valve equipped nozzle.

The apparatus which forms the subject matter of the invention is adapted to be used at gasoline filling stations and in garages and other similar places, and is designed to dispense both low test and high test gasoline from a single source of low test gasoline supply. It is of the automatic or power-operated type and comprises a tank 3 and a super-structure 4. The tank is adapted to be embedded in the ground or the basement of the place at which the apparatus is used, and serves to retain a supply of low test or regular gasoline. The super-structure 4 is positioned above the tank 3 and consists of a base 5, an intermediate section 6 and a top section 7. The base is substantially rectangular in conformation and embodies an upwardly extending marginal flange 8. The intermediate section 6 rests directly upon the base 5. It is held against displacement by means of the flange 8, as shown in Figure 1 of the drawings, and forms a main compartment 9. The top section 7 rests upon and is secured by interfitting flanges 10 to the upper margin of the intermediate section 4 and is shaped to form a pair of vertically extending, side-by-side compartments 11 and 12. The part of the top section 7 which forms the compartment 11 forms the low test side of the super-structure and the part of the top section which forms the compartment 12 forms the high test side. Glass globes 13 containing electric lights (not shown) are mounted on the top of the section 7 and serve to illuminate the apparatus. If desired, these globes may be marked to indicate the low test and high test side of the apparatus as is customary or usual in connection with gasoline-dispensing apparatus of the type to which the present invention relates.

The low test gasoline is drawn from the tank 3 by means of a pump 14. This pump is mounted within the compartment 9 and on the base 5 of the super-structure and is driven by an electric motor 15. The latter is positioned in the compartment 9 at one side of the pump 14 and is connected to drive the pump by means of a belt 16 which extends around a pulley 17 on the armature shaft of the motor 15 and a pulley 18 on the rotor shaft of the pump. The inlet side of the pump is connected to receive low test gasoline from the tank 3 by means of a vertically extending pipe 19 which extends through the base 5 of the super-structure and downwardly to a point slightly above the bottom of the tank. A vertically extending pipe 20 is connected to the outlet side of the pump 14. This pipe is located wholly within the compartment 9 and is provided at its upper end with a low test branch 21 and a high test branch 22. The low test branch 21 is located in the compartment 11 in the top section 7 of the super-structure and comprises a vertically extending pipe 23 which is connected at its lower end to the upper end of the pipe 20 by means of a pair of elbows 24 and a horizontally extending stub pipe 25. The upper end of the pipe 23 of the low test branch 21 is connected to a meter 26 for registering the amount of low test gasoline which flows through the low test branch 21. This meter is located in the upper end of the compartment 11 and is visible from without the super-structure by way of a glass window (not shown) in the upper portion of the part of the top section 7 which forms the compartment 11. A horizontally extending pipe 27 leads from the meter 26 through the top section 7 and is connected to an outside hose 28 which embodies at its outer or distal end a valve-equipped nozzle 29 and is adapted to be used to dispense low test gasoline from the apparatus when the pump 14 is driven by the motor 15. When the hose 28 is not in use, the nozzle 29 is adapted to be hung on a hook 30 which extends through the top section 7 into the compartment 11 as shown in Figure 1. This hook is pivoted within the compartment to swing vertically and is swung upwardly upon removal of the nozzle 29 therefrom by means of a spring 31. A device 32 for showing flow of the low test gasoline from the meter 26 through the hose 28 is connected to the outer end of the horizontally extending pipe 27. This device is of standard construction and serves as a point of attachment for the proximal end of the hose 28.

The motor 15 is included in an electric circuit which comprises conductors 33, 34, 34$^a$. The conductor 33 is connected to one terminal on the motor and the conductor 34 is connected to the other terminal of the motor. A spring contact switch 35 has one contact thereof connected to the conductor 34 and the other contact connected to the conductor 34$^a$ as shown in Figure 1. This switch is located in the compartment 11 and is arranged so that it is shifted into its closed position to complete the circuit through the motor when the nozzle 29 is removed from the hook 30 and the hook is shifted upwardly in response to action of the spring 31. When low test gasoline is to be dispensed from the apparatus, the dispenser removes the nozzle 29 from the hook. As a result of this operation, the hook is shifted upwardly by the spring 31 and the switch 35 is closed thereby completing the circuit which is as follows: conductor 33, motor 15, conductor 34, switch 35 and conductor 34$^a$. Upon completion of this circuit, the motor 15 operates to drive the pump 14. When the valve in the nozzle 29 is opened, the pump, during drive thereof by the motor, draws the low test gasoline from the tank 3 and feeds it through the branch 21 to the meter 26 from whence it flows through the horizontally extending pipe 27 and the device 32 to the hose 28.

The high test branch of the pipe 20 embodies a pair of pipes 36 and 37 and a unitary mixing mechanism 38. This mechanism is located between the pipes 36 and 37 and operates as hereinafter described, to mix with the low test gas passing through the high test branch of the pipe 20, high test fluid such as lead tetraethyl, in order to form high test gasoline. The pipe 36 extends horizontally and is connected to the upper end of the pipe 20 by a T-fitting 39. The pipe 37 extends vertically and is disposed in the compartment 12 in the high test side of the apparatus. It receives from the mechanism 38 high test gasoline, that is, low test gasoline mixed with high test fluid, and delivers it to a meter 40. The latter operates to register the amount or number of gallons of high test gasoline passing through the high test branch of the pipe 20 and is visible from without the super-structure by way of a glass window (not shown) in the part of the top section 7 which forms the compartment 12. The high test gasoline is delivered from the meter 40 to a hose 41 by way of a horizontally extending pipe 42 and a visible flow device 43. The pipe 42 extends through the top section 7 of the superstructure and is connected at its outer end to the device 43. The hose 41 depends from the device 43 and is provided at its discharge or distal end with a valve-equipped nozzle 44. When the hose is not in use, this nozzle is adapted to be supported on a hook 45 which extends through the top section 7 and is pivoted within the compartment 12 so as to swing vertically. A spring 46 is applied to the hook 45 so as to swing the latter upwardly when the nozzle is removed therefrom. A spring contact switch 47 and a pair of conductors 48 and 49 serve automatically to complete a circuit through the motor 15 when the nozzle 44 is withdrawn from the hook 45. The conductor 48 is connected to one of the contacts of the switch 47 and is joined to the conductor 34. The conductor 49 is connected to the other contact of the switch 47 and is joined to the conductor 34a at a point between the switch 35 and the outlet end of the conductor 34. The switch 47 is arranged so that it is closed by the hook when the latter is swung upwardly by the spring 46 after removal of the nozzle. When the nozzle is removed from the hook and the hook is swung upwardly by the spring 46, the following electrical circuit is established: conductor 33, motor 15, conductor 34, conductor 48, switch 47, conductor 49 and conductor 34a. Upon completion of this circuit, current is supplied to the motor 15 with the result that the latter is driven and operates through the medium of the belt 16 to drive the pump 14. When the valve in the nozzle 44 is open and the pump is driven by the motor, low test gasoline is drawn from the tank 3 and delivered to the high test branch 22 of the pipe 20. As the low test gasoline passes through the mechanism 38, high test fluid is supplied thereto so that the gasoline flowing to, and discharged from the hose 41, is of high test variety.

The mechanism 38 for mixing high test fluid with the low test gasoline flowing through the high test branch 22 of the pipe 20 is disposed partly within the compartment 12 and partly within the compartment 9 of the super-structure and comprises a tank 50 for the high test fluid, a pump 51, a needle valve 52 and a mixing pipe 53. The tank 50 is located within the compartment 9, rests on the base 5 of the super-structure 4 and embodies a neck 54 whereby it may be filled. As shown in Figure 1 of the drawings, the neck extends through the intermediate section 6 of the super-structure so that the tank may be filled with high test fluid from the outside of the apparatus. The pump, needle valve and mixing pipe are enclosed with in a casing 55 which is supported in any suitable manner in the intermediate section of the super-structure and is positioned directly over the tank 50 for the high test fluid. The pump 51 rests on the bottom of the casing 55 and has the inlet side thereof connected to the tank 50 by a vertically extending pipe 56. The latter extends through the bottom of the casing 55 and into the tank 50. The outlet side of the pump is connected to the needle valve 52 through the medium of a pipe 57. The pump is driven by means of an electric motor 58 which is positioned within the casing 55 and at one side of the pump, and is operatively connected to the pump by means of a belt 59. The latter extends around a pulley 60 on the armature shaft of the motor and a pulley 61 on the rotor shaft of the pump. When the pump is driven by the motor, the high test fluid is drawn from the tank 50 through the pipe 56 and is discharged by way of the pipe 57 to the needle valve 52 from whence it is admitted to the mixing pipe 53 as hereinafter described, in order to unite with the low test gasoline flowing through the high test branch of the pipe 20 and thus form high test gasoline.

Current is supplied to the motor 58 through the medium of conductors 62, 63 and 63a. The conductor 62 is connected to one of the binding posts of the motor 58 and leads to the conductor 33. The conductor 63 extends between the other binding post of the motor and one contact of a spring contact switch 64. The conductor 63a extends between the other contact of the switch and the conductor 34a. The switch 64 is located in the compartment 12 and is arranged so that it is shifted into its closed position by the hook 45 when the hook is raised or swung upwardly by the spring 46 in response to removal of the nozzle 44 from the hook. When the switch 64 is closed, the following circuit is established: conductor 33, conductor 62, motor 58, conductor 63, switch 64, conductor 63a and conductor 34. Completion of this circuit results in operation of the motor 58 and drive of the pump 51. By virtue of the fact that the switch 64 as well as the switch 47 is controlled by the hook 45, drive of the main pump 14 and the pump 51 is effected upon removal of the nozzle 44 from the hook 45.

The mixing pipe 53 of the mixing mechanism 38 extends horizontally within the casing 55 and is connected to the horizontally extending pipe 36 which extends through one of the side walls of the casing. The needle valve 52 is positioned above the mixing pipe 53 and consists of a casing 65 and a needle 66. The casing communicates with the mixing pipe by way of a depending, hollow stem 67 and is provided with an internally threaded boss 68 whereby it is connected to the discharge end of the pipe 57 leading from the outlet side of the pump 51. The needle 66 determines the flow of high test fluid through the casing 65 and into the mixing pipe 53 and is shiftable vertically for adjustment purposes by means of a rod 69. The latter is slidably mounted in a plug 70 in the upper end of the casing 65 and is held in any suitable manner against rotation. Vertical shift of the rod 69 for needle-adjusting purposes is effected by means of a pair of bevelled gears 71 and 72 and a rod 73. The bevelled gear 71 is mounted on the upper end of the stem 69 and is connected to the latter by means of a screw thread. The gear 72 meshes with the gear 71 and is fixed to one end of the rod 73. The other end of the rod extends through the casing 65 and is provided with a hand wheel so that the rod may be turned. Turning of the rod serves to rotate the gears 71 and 72 and results in vertical shift of the stem 69 through the medium of the screw thread between the rod and the gear 71. When the needle valve is properly adjusted, the high test fluid flows from the casing of the valve into the mixing pipe 53 where it unites or joins with the low test gasoline flowing through the mixing pipe and results in formation of high test gasoline. From the mixing pipe 53, the high test gasoline flows through a vertically extending pipe 74 into a receptacle 75. This receptacle, as shown in the drawings, is mounted on top of the casing 55 and embodies a chamber 76 through which the high test gasoline flows prior to passage to the vertically extending pipe 37 of the high test branch of the pipe 20. Baffles 77 are secured to the top and bottom walls of the receptacle 75 and are arranged in staggered relation and so that they cause the high test gasoline to travel back and forth for mixing purposes as it flows through the chamber 76. The pipe 74 which serves to conduct the high test gasoline from the mixing pipe 53 into the receptacle 75 is connected to the discharge end of the mixing pipe by an elbow 78 and extends upwardly through the top of the casing 55 where it is joined to the bottom of the receptacle 75. The pipe 37 is connected to the outlet or discharge end of the receptacle 75 by way of a pair of pipe sections 79 which are suitably connected together. By employing the baffle-equipped receptacle 75, an efficient agitation and mixing of the high test fluid with the low test gasoline is effected, prior to discharge of the gasoline from the hose 41. A valve 80 serves to control the flow of low test gasoline from the pipe 20 to the mixing pipe 53 in the casing 55. This valve is located between the discharge end of the horizontally extending pipe 36 and the inlet end of the mixing pipe 53 and embodies a vertically slidable stem 81 whereby it is shifted into and out of its open position. This stem is connected by linkage to the hook 45 so that it is shifted for valve-opening purposes when the hook 45 is shifted upwardly by the spring 46. The linkage consists of a rod 82 which extends horizontally and is connected to a depending finger 83 on the hook 45; a bell crank 84 which is suitably fulcrumed and has one arm thereof connected to the other end of the rod 82; a rod 85 which extends vertically and through the top of the casing 55 and has the upper end thereof connected to the other arm of the bell crank; and a centrally fulcrumed lever 86 which is pivotally connected to the lower end of the rod 85 and is connected by a pin and fork connection to the upper end of the stem 81. When the nozzle 44 is removed from the hook 45 and the hook is swung upwardly in response to action of the spring 46, the linkage consisting of the rod 82, the bell crank 84, the rod 85 and the lever 86 shifts the stem 81 so as to open the valve 80. When the valve is open, the low test gasoline is free to flow from the pipe 20 to the mixing pipe 53 and thence to the baffle-equipped chamber 76, as previously pointed out. When the nozzle is placed on the hook 45, the aforementioned linkage operates to close the valve so as to prevent back-flow of the high test gasoline which is formed by mixing the high test fluid from the tank 50 with the low test gasoline in the mixing pipe 53.

In order to prevent feed or delivery of the high test fluid into the mixing pipe 53 when the low test gasoline is not flowing through the mixing pipe, a valve 87 is provided. This valve consists of a substantially cylindrical casing 88 and a plunger 89. The casing is included in the pipe 57 and embodies inlet and outlet openings whereby the high test fluid is permitted to pass therethrough to the needle valve 52. The ends of the casing are closed by means of screw plugs 90. The plunger 89 is vertically slidable in the casing of the valve 87 and is provided with a crossport 91 which registers with the inlet and outlet of the valve casing when the plunger is raised. When the plunger is shifted downwardly in the casing, communication between the inlet and outlet of the valve casing is cut off. A spring 92 is interposed between one of the screw plugs 90 and the plunger 89 is arranged so that it urges the plunger into its closed position. Shift of the plunger into its open position is effected by means of a flapper 93 and an arm 94. The flapper is pivotally supported in a casing 95 which is included in the mixing pipe 53 and is adapted to have the low test gasoline pass therethrough. The arrangement of the flapper within the casing 95 is such that when the low test gasoline flows through the casing, the flapper is swung upwardly, and when the flow of low test gasoline through the casing 95 is cut off by closing of the valve 80, the flapper swings downwardly. The arm 94 is positioned along one side of the mixing pipe 53 and has one end thereof pivoted to the casing 95. The other end of the arm is applied to a stem 96 which depends from the plunger 89 and extends through the lowermost screw plug 90. A member 97 is pivotally connected to the central portion of the arm and extends through the casing into engagement with a lug 98 on the flapper 93. This dog operates when the flapper is swung upwardly by flow of the low test gasoline through the casing 95, to swing the arm 94 upwardly and thus to shift the plunger 89 into its open position. When the valve 80 is closed so as to cut off flow of the low test gasoline into the casing 95, the spring 92 shifts the plunger 89 into its closed position and returns the arm 94 and the flapper to their normal position.

The operation of the apparatus is as follows:

When it is desired to dispense low test gasoline from the apparatus, the nozzle 29 is removed from the hook 30 and is applied at the point where the gasoline is to be dispensed. Upon removal of the nozzle from the hook, the hook, as hereinbefore described, is swung upwardly by the spring 31 and operates to close the switch 35. This causes drive of the pump 14 by the electric motor 15 and results in low test gasoline being drawn from the tank 3 and being supplied to the hose 28 via the meter 26 and the visible flow device 32. By opening the valve in the nozzle 29, the gasoline is allowed to flow through the pipe for dispensing purposes. Upon return of the nozzle 29 to the hook 30, the circuit for the motor 15 is broken and drive of the pump 14 is stopped. When it is desired to dispense high test gasoline from the apparatus, the nozzle 44 is removed from the hook 45. Upon removal of the nozzle from the hook, the hook is swung upwardly by the spring 46 and closes the switches 47 and 64. The closing of these two switches results in drive of the pumps 14 and 51. In addition to closing the switches 47 and 64, upward swing of the hook 45 results in opening of the valve 80. When the valve 80 is in its open position and the pumps 14 and 51 are in operation, low test gasoline flows through the pipe 20 and into the mixing pipe 53 by way of the valve 80 and the casing 95. Upon flow of the low test gasoline through the casing 95, the flapper 93 is swung upwardly and through the medium of the arm 94, opens the plunger 89 so that high test fluid from the tank 50 is allowed to flow to the needle valve 52 and from there, into the mixing pipe 53 where it mixes with the low test gasoline and forms high test gasoline. This high test gasoline flows from the mixing pipe to the receptacle 75 where it is subjected to the actions of the baffles 77 which effect a thorough mixing of the high test gasoline. From the receptacle 75, the high test gasoline flows through the meter 40 and the visible flow device 43 to the hose 41, from whence it may be dispensed by opening of the valve in the nozzle 44. Regulation or adjustment of the amount of high test fluid introduced into the mixing pipe 53 is effected by manipulation of the hand wheel on the rod 73.

The herein described apparatus may be manufactured at a comparatively low and reasonable cost and is exceedingly efficient in operation. It eliminates the necessity of utilizing separate storage tanks for low test and high test gasoline. By virtue of the fact that the mechanism for mixing the high test fluid with the low test gasoline is of a unitary character, it may be applied as a unit to gasoline-dispensing apparatus of standard construction.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a gasoline-dispensing apparatus of the character described, the combination of a tank for low test gasoline; a gasoline-dispensing line embodying a flexible hose at the outlet end thereof; a pump for drawing the low test gasoline from the tank and forcing it through the line; and mechanism for introducing high test fluid into the low test gasoline as the latter flows through the line in order to form high test gasoline prior to discharge of the gasoline from the hose, comprising a tank for the high test fluid and a motor-driven pump connected to draw the high test fluid from the last mentioned tank and having an outlet connection leading to and communicating directly with the line whereby the high test fluid is forced under pressure into said line during operation of the motor-driven pump.

2. In a gasoline-dispensing apparatus of the character described, the combination of a tank for low test gasoline; a gasoline-dispensing line embodying a flexible hose at the outlet end thereof; a pump for drawing the low test gasoline from the tank and forcing it through the line; and mechanism for introducing high test fluid into the low test gasoline as the latter flows through the line in order to form high test gasoline prior to discharge of the gasoline from the hose, comprising a tank for the high test fluid, a motor-driven pump connected to draw the high test fluid from the last mentioned tank and having an outlet connection leading to and communicating directly with the line whereby the high test fluid is forced under pressure into the line during operation of the motor-driven pump, and a needle valve included in said outlet connection for regulating the flow of high test fluid from said motor-driven pump to the line.

3. In a gasoline-dispensing apparatus of the character described, the combination of a tank for low test gasoline; a gasoline-dispensing line embodying a flexible hose at the outlet end thereof; a pump for drawing the low test gasoline from the tank and forcing it through the line; mechanism for introducing high test fluid into the low test gasoline as the latter flows through the line in order to form high test gasoline prior to discharge of the gasoline from the hose, comprising a tank for the high test fluid and a pipe connection between the last mentioned tank and the line; a normally closed valve for controlling the flow of high test fluid into the line; and means operable by flow of the low test gasoline through the line for automatically shifting the valve into its open position.

4. In a gasoline-dispensing apparatus of the character described, the combination of a tank for low test gasoline; a gasoline-dispensing line embodying a flexible hose at the outlet end thereof; a pump for drawing the low test gasoline from the tank and forcing it through the line; mechanism for introducing high test fluid into the low test gasoline as the latter flows through the line in order to form high test gasoline prior to discharge of the gasoline from the hose, comprising a tank for the high test fluid and a pipe connection between the last mentioned tank and the line; a normally closed valve in the pipe connection for cutting off the flow of high test fluid into the line; and means operative in response to flow of the low test gasoline through the line for shifting said valve into its open position.

5. In a gasoline-dispensing apparatus of the character described, the combination of a tank for low test gasoline; a gasoline-dispensing line embodying a flexible hose at the outlet end thereof; a pump for drawing the low test gasoline from the tank and forcing it through the line; mechanism for introducing high test fluid into the low test gasoline as the latter flows through the line in order to form high test gasoline prior to discharge of the gasoline from the hose, comprising a tank for the high test fluid and a motor-driven pump connected to draw the high test fluid from the last mentioned tank and having an outlet connection leading to and communicating directly with the line whereby the high test fluid is forced under pressure into the line during operation of the motor-driven pump; a normally closed valve in said outlet connection for cutting off the flow of high test fluid into the line; and means operative in response to flow of the low test gasoline through the line for shifting said valve into its open position.

6. In a gasoline-dispensing apparatus of the character described, the combination of a tank for low test gasoline; a gasoline-dispensing line embodying a flexible hose at the outlet end thereof; a pump for drawing the low test gasoline from the tank and forcing it through the line; mechanism for introducing high test fluid into the low test gasoline as the latter flows through the line in order to form high test gasoline prior to discharge of the gasoline from the hose, comprising a tank for the high test fluid, a motor-driven pump connected to draw the high test fluid from the last mentioned tank and having an outlet connection leading to and communicating with the line, and a needle valve included in said outlet connection for regulating the flow of high test fluid from the pump to the line; a valve in the outlet connection between the second mentioned pump and the needle valve for cutting off the flow of high test fluid to the line; and means operative in response to flow of low test gasoline through the line for shifting the cut-off valve into its open position.

7. In a gasoline-dispensing apparatus of the character described, the combination of a tank for low test gasoline; a gasoline-dispensing line embodying a flexible hose at the outlet end thereof; a pump for drawing the low test gasoline from the tank and forcing it through the line; a motor for operating the pump; mechanism for introducing high test fluid into the low test gasoline as the latter flows through the line in order to form high test gasoline prior to discharge of the gasoline from the hose, comprising a tank for the high test fluid, a pump connected to draw the high test fluid from the last mentioned tank and force it into the line, and a motor for driving the high test pump; and means for conjointly controlling the two motors.

8. In a gasoline-dispensing apparatus of the character described, the combination of a tank for low test gasoline; a gasoline-dispensing line embodying a flexible, nozzle-equipped hose at the outlet end thereof; a hook for supporting the nozzle when the line is not in use; a pump for drawing the low test gasoline from the tank and forcing it through the line; a motor for operating the pump; mechanism for introducing high test fluid into the low test gasoline as the latter flows through the line in order to form high test gasoline prior to discharge of the gasoline from the hose, comprising a tank for the high test fluid, a pump connected to draw the high test fluid from the last mentioned tank and force it into the line, and a motor for operating the high test pump; and means operative automatically in response to removal of the nozzle from the hook for starting the two motors.

9. In a gasoline-dispensing apparatus of the character described, the combination of a tank for low test gasoline; a gasoline-dispensing line embodying a flexible, nozzle-equipped hose at the outlet end thereof; a vertically movable, spring-supported hook for supporting the nozzle of the hose when the line is not in use; a pump for drawing the low test gasoline from the tank and forcing it through the line; an electric motor for operating the pump; mechanism for introducing high test fluid into the low test gasoline as the latter flows through the line in order to form high test gasoline prior to discharge of the gasoline from the hose, comprising a tank for the high test fluid, a pump connected to draw the high test fluid from the last mentioned tank and force it into the line, and an electric motor for operating the high test pump; and circuits for supplying electrical energy to the two motors including switches therein arranged to be closed automatically by the hook when the nozzle is removed therefrom.

10. In a gasoline-dispensing apparatus of the character described, the combination of a tank for low test gasoline; a gasoline-dispensing line embodying a flexible hose at the outlet end thereof; a pump for drawing the low test gasoline from the tank and forcing it through the line; mechanism for introducing high test fluid into the low test gasoline as the latter flows through the line in order to form high test gasoline prior to the discharge of the gasoline from the hose; a baffle-equipped receptacle disposed in the line between the hose and the point at which the high test fluid is introduced into the line and serving to effect a thorough mixing of the fluid and the low test gasoline before discharge through the hose; and a valve disposed in the line between the pump and the aforesaid point and operative automatically to prevent back-flow of the high test gasoline from the receptacle to the tank when the flow of high test gasoline through the line is stopped.

11. In a gasoline-dispensing apparatus of the character described, the combination of a tank for low test gasoline; a gasoline-dispensing line embodying a flexible, nozzle-equipped hose at the outlet end thereof; a vertically movable, spring-supported hook for supporting the nozzle when the line is not in use; a pump for drawing the low test gasoline from the tank and forcing it through the line; mechanism for introducing high test fluid into the low test gasoline as the latter flows through the line in order to form high test gasoline prior to discharge of the gasoline from the hose; a valve in the line between the pump and the point at which the high test fluid is introduced into the line; and means actuated by the hook for automatically closing said valve to prevent back-flow of the high test gasoline into the tank when the nozzle is placed on the hook.

12. In a gasoline-dispensing apparatus of the character described, the combination of a tank for low test gasoline; a casing structure provided at the upper end thereof with a gasoline-dispensing hose and a meter for indicating the amount of gasoline passing through the hose; piping extending through the casing structure and leading from the tank to the meter; a pump connected to the piping and operative during drive thereof to draw the low test gasoline from the tank and force it through the meter and thence to the hose; and pump-operated mechanism for introducing high test fluid into the low test gasoline as the latter flows through the piping in order to form high test gasoline prior to discharge of the gasoline through the hose, said mechanism being in the form of a unit and disposed within the casing structure.

13. In a gasoline-dispensing apparatus of the character described, the combination of a tank for low test gasoline, a gasoline-dispensing line leading from the tank and having a pair of branches with flexible discharge hoses at the ends thereof; a pump included in the line and operative during drive thereof to draw the low test gasoline from the tank and force it through the two branches; and mechanism associated with one of the branches for introducing high test fluid into the low test gasoline passing through such branch in order to form high test gasoline prior to discharge of the gasoline from the hose of said one branch, comprising a tank for the high test fluid and a motor-driven pump connected to draw the high test fluid from the last mentioned tank and having an outlet connection leading to and communicating directly with said one branch whereby the high test fluid is forced under pressure into said one branch during operation of the motor-driven pump.

14. In a gasoline-dispensing apparatus of the character described, the combination of a tank for low test gasoline; a gasoline-dispensing line leading from the tank and having a pair of branches with flexible discharge hoses at the ends thereof; a pump in the line for drawing the low test gasoline from the tank and forcing it to the two branches; an electric motor for driving the pump; mechanism including a pump and an electric motor for driving the pump, for introducing high test fluid into the low test gasoline passing through one of the branches in order to form high test gasoline prior to discharge of the gasoline from the hose of said one branch; and electrical circuits for supplying current to the two motors embodying switch means associated with said one branch of the gasoline-dispensing line for conjointly controlling the motors for the two pumps, and switch means associated with the other branch for controlling the motor for the first mentioned pump independently of the motor for the high test pump.

ROGER J. DALEY.